May 11, 1926. 1,584,516

A. M. DEMUTH

COOKING APPARATUS

Filed Dec. 26, 1925

Inventor,
Alfred M. Demuth
By J. C. Jochum Jr. Atty

Patented May 11, 1926.

1,584,516

UNITED STATES PATENT OFFICE.

ALFRED M. DEMUTH, OF CHICAGO, ILLINOIS.

COOKING APPARATUS.

Application filed December 26, 1925. Serial No. 77,797.

This invention relates to improvements in cooking apparatus and more particularly to a cooking utensil in which the articles are cooked by steam, and one of the objects of the invention is to provide in an improved apparatus of this character a partition for forming in the cover, a compartment for receiving the steam and in which compartment is arranged a baffle shaped to oppose the partition and against which baffle the steam as it enters the compartment through the partition will strike, the baffle operating to direct the products of condensation through the partition and back into the cooking utensil.

A further object is to provide an improved partition and baffle which are compactly arranged within the cover or closure of the cooking utensil and which may be readily removed and as readily replaced and secured in position.

Figure 1:
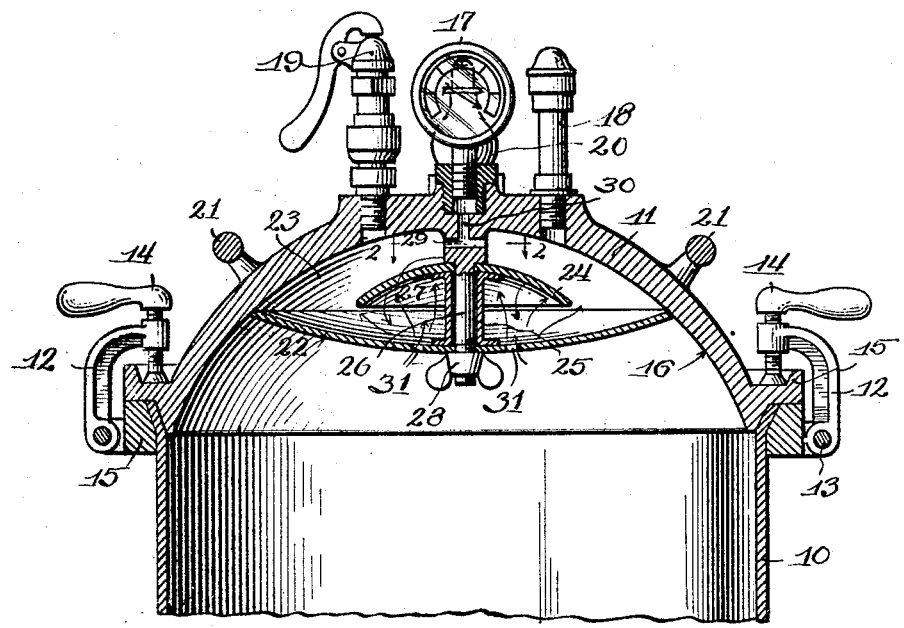

To the attainment of these ends and the accomplishment of other new and useful objects as will appear, the invention consists in the features of novelty in substantially the construction, combination and arrangement of the several parts, hereinafter more fully described and claimed and shown in the accompanying drawing illustrating this invention and in which:

Figure 1 is a vertical longitudinal sectional view, partly broken away, of a cooking apparatus constructed in accordance with the principles of this invention.

Figure 2:
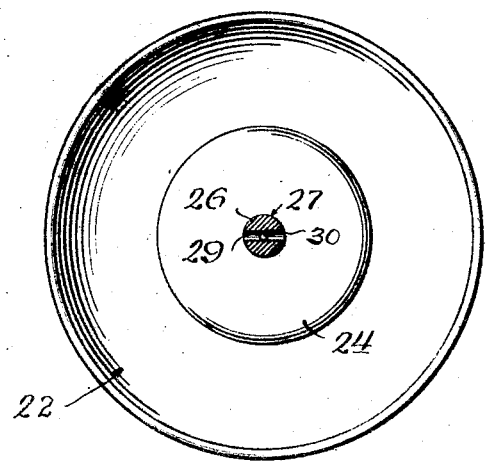

Figure 2 is a detail horizontal sectional view taken on line 2—2 Figure 1.

Figure 3:
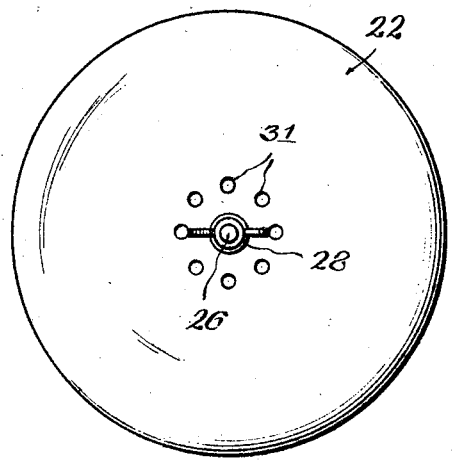

Figure 3 is a bottom plan view of the partition.

Referring more particularly to the drawing the numeral 10 designates generally a cooking utensil or vessel of any desired size and configuration, having a cover 11 applied thereto and secured in position in any suitable manner such as by means of clamps 12 pivotally mounted as at 13, and having clamping devices 14 adjustably connected with the supporting member. The clamping devices are adapted to engage a flange or projection 15 on the cover 11 for removably securing the cover in position.

The cover is preferably provided with a concaved lower face 16, and a pressure gage 17, an air vent 18, a blow off valve 19, and a pet-cock or valve 20 may be provided which are mounted upon the cover and have communication with the interior of the vessel or utensil through the cover.

Suitable handles 21 may also be provided on the cover.

Arranged within the cover 11 is a partition 22 which is of a diameter to extend across the cover above the bottom thereof, so that its periphery will engage the face 16 of the cover.

The partition is of such a diameter that when in position it will be spaced below the top of the concaved surface 16 of the cover, and the partition itself is preferably concaved in opposition to the opposite face of the cover 11.

The partition when in position will form a chamber 23 within the cover and arranged within this chamber is a baffle or deflector 24 which is of a diameter considerable less than the diameter of the partition 22. The baffle 24 is also preferably concaved and is arranged so that the concavity thereof will be in opposition to the concavity of the partition 22.

The baffle 24 and partition 22 are secured together in spaced relation in any suitable manner, preferably by means of a tubular element 25 disposed between the baffle and partition and secured to both of them.

Depending from the cover 11 is a support 26 preferably formed integral with the cover, and is of any desired length, the free extremity of the support being preferably provided with threads.

A shoulder 27 is also formed on the support 26 and the portion of the support below the shoulder 27 passes through the baffle 24, the tubular element 25, and the partition 22 to extend below the latter. A collar 28 preferably in the form of a thumb nut is threaded upon the extremity of the support 26 and engages the partition 22. The baffle 24 contacts with the shoulder 27 of the support and the shoulder is so disposed with respect to the length of the support, that when the baffle 24 engages the shoulder, the periphery of the partition 22 will be in contact with the face 16 of the cover 11.

The parts are held in this assembled relation by means of the thumb nut or collar 28, and which latter is adapted to be detached from the support so as to permit the partition and the baffle to be removed as a unit from the cover 11 when desired.

The shoulder 27 is spaced for a considerable distance below the top of the concaved surface of the cover, and is provided with a passage 29 therethrough which communicates with the chamber 23. The passage 29 has communication with another passage 30 through the cover 11 and with which passage 30 the pressure gage has communication, so that the vapor in the chamber 23 will operate upon the pressure gage 17.

The air vent 18, the blow off 19, and the pet-cock 20 have communication with the chamber 23 above the baffle 24 so that when steam enters the chamber 23 it will strike the baffle 24 and the steam will be deflected so that the foreign particles carried thereby will not be directed into the openings of the valve devices or the pressure gage.

The partition 22, is provided with apertures 31 therethrough preferably adjacent the diametric center thereof, below the baffle 24.

Any number of these apertures 31 may be provided and they serve the purpose of permitting the steam to pass through the partition to engage the baffle 24.

The products of condensation which fall upon the baffle 22 will flow towards the apertures 31 and pass therethrough to be delivered back into the vessel or utensil 10.

With this improved construction it will be manifest that there is provided a sanitary construction compactly arranged within the cover, and which construction embodies means whereby the valve openings or the openings for the various attachments carried by the cover, will not be clogged or obstructed by the foreign particles from the articles which are being cooked, and that are carried by the steam.

While the preferred form of the invention has been herein shown and described, it is to be understood that various changes may be made in the details of construction and in the combination and arrangement of the several parts within the scope of the claims, without departing from the spirit of this invention.

What is claimed as new is:—

1. A cooking apparatus including in combination a cooking vessel, a cover forming a closure therefor, a partition arranged within the cover above the base thereof and co-operating with the cover to form a compartment therein, means removably securing the partition in position, there being passages through the partition forming communication between said compartment and the interior of the vessel, and a vapor baffle within the compartment, the said baffle being of a diameter considerably less than the diameter of the chamber, said partition being concaved in opposition to the opposite face of the cover.

2. In combination a cover for a cooking vessel, the lower face of said cover being concaved, a partition within said concaved partition and extending thereacross, said partition being concaved in opposition to the said face of the cover and having passages therethrough, a baffle concaved in opposition to and supported above the said partition, said baffle being of a diameter considerably less than the partition, and extending over the said passages in the partition, a support depending from said cover and extending through the baffle and partition, and a removable fastening device engaging the support for holding the parts together.

3. In combination, a cover for a cooking vessel, the lower face of the cover being concaved, two spaced and opposed concaved members, the diameter of one of said members being considerably greater than the other member, means embodying a tubular member for connecting said members together and for maintaining them in spaced relation, the lower member having passages therethrough disposed beneath the other member, a support depending from the closure and passing through said concaved and tubular members, and a removable fastening device engaging the said support for maintaining the periphery of the larger of said concaved members in engagement with the face of said cover.

4. In combination a concaved cover for a cooking vessel, a support depending therefrom, two spaced members concaved in opposition to each other, one of said members being of a diameter considerably greater than the other member and having passages therethrough beneath the other member, means for connecting said members and for maintaining them in spaced relation, the said support passing through the said concaved members, and a collar threaded upon the said support beneath said members and operating to maintain the periphery of the larger of the said members in contact with the lower face of said cover.

5. In combination a concaved cover for a cooking vessel, a support depending therefrom, two spaced members concaved in opposition to each other, one of said members being of a diameter considerably greater than the other member and having passages therethrough beneath the other member, means for connecting said members and for maintaining them in spaced relation, the said support passing through the said concaved members, a collar threaded upon the said support beneath said members and operating to maintain the periphery of the larger of the said members in contact with the lower face of said cover, and a shoulder on said support against which the other of said members abuts.

6. As an article of manufacture a combined partition and baffle concaved in opposition to each other, and a tubular member disposed between the partition and baffle and secured thereto for holding them spaced and out of contact with each other, the said baffle being of a diameter considerably less than the diameter of the said partition, there being apertures through the said partition beneath the baffle, there being alined openings through the baffle and partition and with which last recited openings the said tubular member registers.

7. In combination with a concaved cover, a combined partition and baffle concaved in opposition to each other, a tubular member intermediate the partition and baffle and disposed centrally thereof and secured thereto for maintaining them spaced, and out of contact with each other, the diameter of the baffle being considerably less than the diameter of the partition, there being apertures through the partition beneath the baffle, a support depending from the cover and passing through the said baffle, tubular member and partition, and a collar threaded upon said support and engaging the partition for removably securing the partition in position and the periphery thereof in contact with the face of said cover.

8. In combination with a concaved cover, a combined partition and baffle concaved in opposition to each other, a tubular member intermediate the partition and baffle and disposed centrally thereof and secured thereto for maintaining them spaced, and out of contact with each other, the diameter of the baffle being considerably less than the diameter of the partition, there being apertures through the partition beneath the baffle, a support depending from the cover and passing through the said baffle, tubular member and partition, a collar threaded upon said support and engaging the partition for removably securing the partition in position and the periphery thereof in contact with the face of said cover, and a shoulder on the said support against which the said baffle abuts.

In testimony whereof I have signed my name to this specification, on this 24th day of December, A. D. 1925.

ALFRED M. DEMUTH.